(12) United States Patent
Weinstein et al.

(10) Patent No.: US 6,254,320 B1
(45) Date of Patent: Jul. 3, 2001

(54) FIXTURE FOR DRILLING POCKET HOLES

(75) Inventors: Burton Weinstein, City Island; Richard H. Deaton, New York, both of NY (US)

(73) Assignee: Simp'l Products, Inc, City Island, NY (US)

( * ) Notice: Subject to any disclaimer, the term of this patent is extended or adjusted under 35 U.S.C. 154(b) by 0 days.

(21) Appl. No.: 09/517,253

(22) Filed: Mar. 2, 2000

(51) Int. Cl.$^7$ .................................................. B23B 49/00
(52) U.S. Cl. ........................................ 408/103; 408/115 R
(58) Field of Search ....................................... 408/103, 105, 408/115 R, 115 B, 241 B, 241 R, 241 G

(56) References Cited

U.S. PATENT DOCUMENTS

| | | |
|---|---|---|
| 917,488 | 4/1909 | Roberts . |
| 3,708,237 | 1/1973 | Kraus . |
| 4,093,394 * | 6/1978 | Adams .................................. 408/103 |
| 4,145,160 * | 3/1979 | Wiggins ................................ 408/103 |
| 4,955,766 * | 9/1990 | Sommerfeld ........................... 408/87 |
| 5,063,982 * | 11/1991 | Durney .................................. 144/365 |
| 5,466,098 | 11/1995 | Juang . |
| 5,676,500 * | 10/1997 | Sommerfeld .......................... 408/103 |
| 5,791,835 * | 8/1998 | Chiang et al. ..................... 408/115 R |
| 5,800,099 * | 9/1998 | Cooper ................................. 408/1 R |

* cited by examiner

*Primary Examiner*—Henry Tsai
(74) *Attorney, Agent, or Firm*—Gordon D. Coplein

(57) ABSTRACT

A U-shaped fixture for drilling pocket holes in a workpiece having a base leg, a guide leg and a clamp leg with the base leg joining the guide leg and clamp leg and there is a guide channel in the guide leg at an angle to the guide leg having an entrance on an exterior surface and an exit on the guide leg interior surface which is to oppose a first surface of the workpiece with a second surface of the workpiece generally transverse to the first surface resting on the interior of the base leg. A threaded adjustable clamp on the clamp leg is movable to engage a third surface of the workpiece that is opposite the first surface to hold the workpiece during the time a drill bit is advanced in the angled guide channel to the workpiece first surface. There is a set of spaced ribs on the interior of the guide leg against which the workpiece first surface rests and the exit opening of the guide channel is in the space between said ribs to permit clearance for ejection of wood chips from the drill bit and the base leg has a recess along an extension line of the guide channel into which the tip of the drill can protrude after it passes through the workpiece.

10 Claims, 2 Drawing Sheets

FIXTURE FOR DRILLING POCKET HOLES

FIELD OF THE INVENTION

The invention relates to a fixture for drilling pocket holes in a workpiece.

BACKGROUND OF THE INVENTION

The use of fixtures for location and guidance of a drill bit to drill holes in a workpiece, such as a piece of wood, for pocket joints is well known. A pocket hole is one that is made at an angle in a piece of wood and a wood screw is inserted into the hole to join the workpiece to another wood piece. The screw is recessed in the hole and is not exposed.

U.S. Pat. No. 4,955,766 discloses the combination of a drill bit with a stop collar and a fixture used for making pocket holes at an angle to a surface of the workpiece. The fixture has an L-shaped base with one leg serving as a guide portion for the workpiece and the other as a portion to hold a clamping device, shown as an over-center clamp. An angled channel having a stop flange at its upper end is provided on the guide portion leg. The drill bit is inserted into the channel and drills a hole at an angle in the workpiece up to the point where the stop collar engages the flange. The fixture of this patent is somewhat complicated in that the over-center clamp is required as well as the drill bit with a stop collar. Also, in this patent the workpiece is held against a flat surface and the wood chips produced during the drilling can only escape up through the channel. This has a tendency to clog the drill bit and to adversely affect its efficiency.

U.S. Pat. 1,128,970 discloses a fixture for drilling holes for dowels, the holes being drilled transverse to the workpiece. The workpiece is held in a base by a clamp and a carriage containing bushings for passage of a drill bit into the workpiece is moveable over the base to place the hole of a over a proper location on the workpiece. While the clamp of this patent is relatively simple as compared to an over-center clamp, the fixture does not show drilling of an angled pocket hole.

BRIEF DESCRIPTION OF THE INVENTION

The present invention relates to an improved and relatively simple fixture for making pocket holes in a workpiece. In accordance with the invention the fixture is U-shaped. One of the legs of the U shaped fixture is the guide leg, against the interior of which the surface of the workpiece to be drilled rests. This guide leg has an angled channel to accept a drill bit, preferably of the stepped type. The fixture leg opposite to the guide leg has a threaded hole through which passes a screw threaded clamp. A base leg connects the guide and clamp legs to complete the U.

In the use of the fixture, one surface of the workpiece rests on the base leg and another against the interior surface of the guide leg. The threaded clamp is moved from the clamp leg toward the surface of the workpiece facing the clamp leg to engage it and thereby hold the workpiece securely while the drill is advanced through the angled guide channel to make the hole in the workpiece.

In a preferred embodiment of the invention the interior surface of the guide leg has several spaced ribs preferably extending transverse to the leg. The workpiece surface engages the ribs. The exit opening of the drill bit channel is between the ribs on the guide leg. The space between the ribs provides a passage for the wood chips to exit from the drill bit as the hole is being drilled in the workpiece. The base leg has a recess on its interior surface located where the drill bit exits the workpiece through the drilled angled hole. This helps keep the end of the drill bit from contacting the base leg and being damaged.

The fixture accepts a conventional stepped drill bit in the guide channel and no stop collar for the drill bit and flange for the base wall is required. The fixture is simple in construction and efficient in operation permitting precise drilling of a pocket hole in a workpiece.

OBJECTS OF THE INVENTION

It is an object of the present invention to provide a novel fixture for drilling pocket holes in a workpiece.

A further object is to provide a U-shaped fixture for forming pocket holes in a workpiece in which a fixture guide leg against which the workpiece rests has an angled guide channel through which the drill bit passes and the opposing leg holds a threaded clamp which is advanced to clamp the workpiece against the guide leg.

Yet another object is to provide a U-shaped fixture for forming pocket joints in a workpiece with the interior of the leg against which the workpiece rests has a pair of spaced ribs between which there is the exit of an angled guide channel through which the drill bit passes to enter the workpiece serving as a passage for the wood chips produced during the drilling.

A further object is to provide a U-shaped fixture for drilling pocket holes in which the base leg on which a surface of the workpiece rests has a recess at the point where the drill bit exits the angled hole made in the workpiece.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
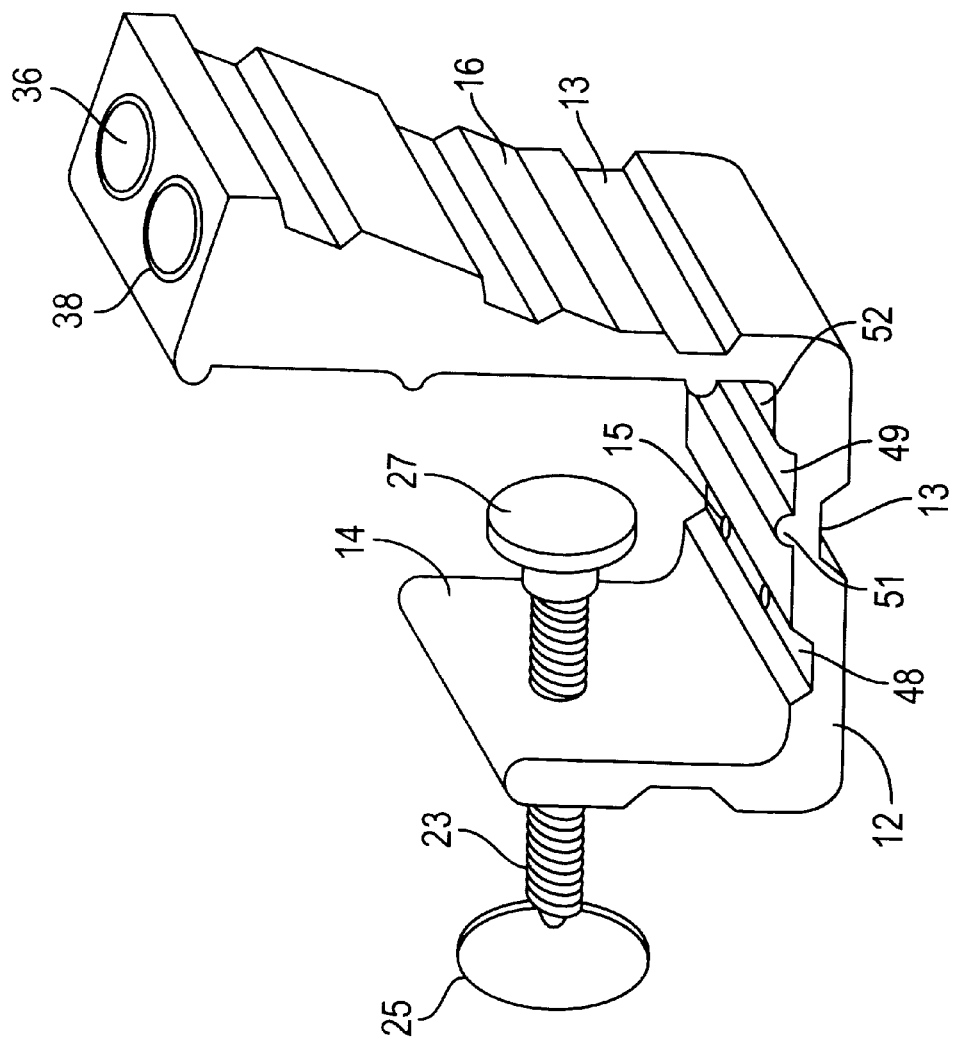
FIG. 1 is a perspective view of the fixture.

Referring to the drawings, the fixture 10 is generally U-shaped and can be made of any suitable construction, such as an aluminum extrusion or casting. Any suitable material can be used. The fixture has a base leg 12 which connects two legs 14 and 16, hereafter referred to as the clamp leg and the guide leg. The outer surface of the base leg 12 has flat portions to permit the fixture to rest on a flat surface S. Several holes 15 are formed in a base leg channel 48 to permit passage of screws (not shown) to secure the fixture to the surface S.

The clamp leg 14 is transverse to the base leg 12 and has a threaded hole 21 to accept a threaded thumb screw clamp 23 having a thumb engaging piece 25 exterior to the fixture and a workpiece engaging cap 27 interior of the fixture. The position of the cap relative to the opposing fixture guide leg 16 is controlled by turning the screw. While the cap 27 is shown as having a circular outer face only of somewhat greater diameter than the screw, it can be enlarged to provide a larger surface for engaging the workpiece W.

The inner face of the guide leg 16 is transverse to the inner face of the base leg 12 while the outer part 31 flares outwardly at the angle that the pocket hole is to be drilled. As seen, guide leg 16 tapers from a thick upper part to the thinner bottom part which joins the base leg. The outer surface of the guide leg 16, as well as that of the base and clamp legs 12 and 14, is shown with spaced depressed sections, such as 13 on the base leg 12, across the width of each leg. These are primarily for decorative and fixture manufacturing purposes.

As seen in FIG. 1, a pair of spaced angled guide channels 35 are formed in the guide leg 16. The number of channels can be selected as desired and there can be only a single channel. One of the channels 35 is described referring to FIG. 2. and the description of the other would be the same. The channel has an entrance 36 at the guide leg 16 top end and an exit 37 on the interior of the guide leg for a drill bit B which is rotated by a drill D. A bushing 38 of a hardened metal preferably is located in the channel 35 to set the size of the drill bit to be accepted and to withstand wear caused by the rotating drill bit. The angle of each channel in guide leg 16 is the angle to be made for the pocket hole in the workpiece. The exit 37 of channel 35 on the interior of the guide leg is of generally elliptical shape since the channel 35 is at an angle to the guide leg.

Figure 2:
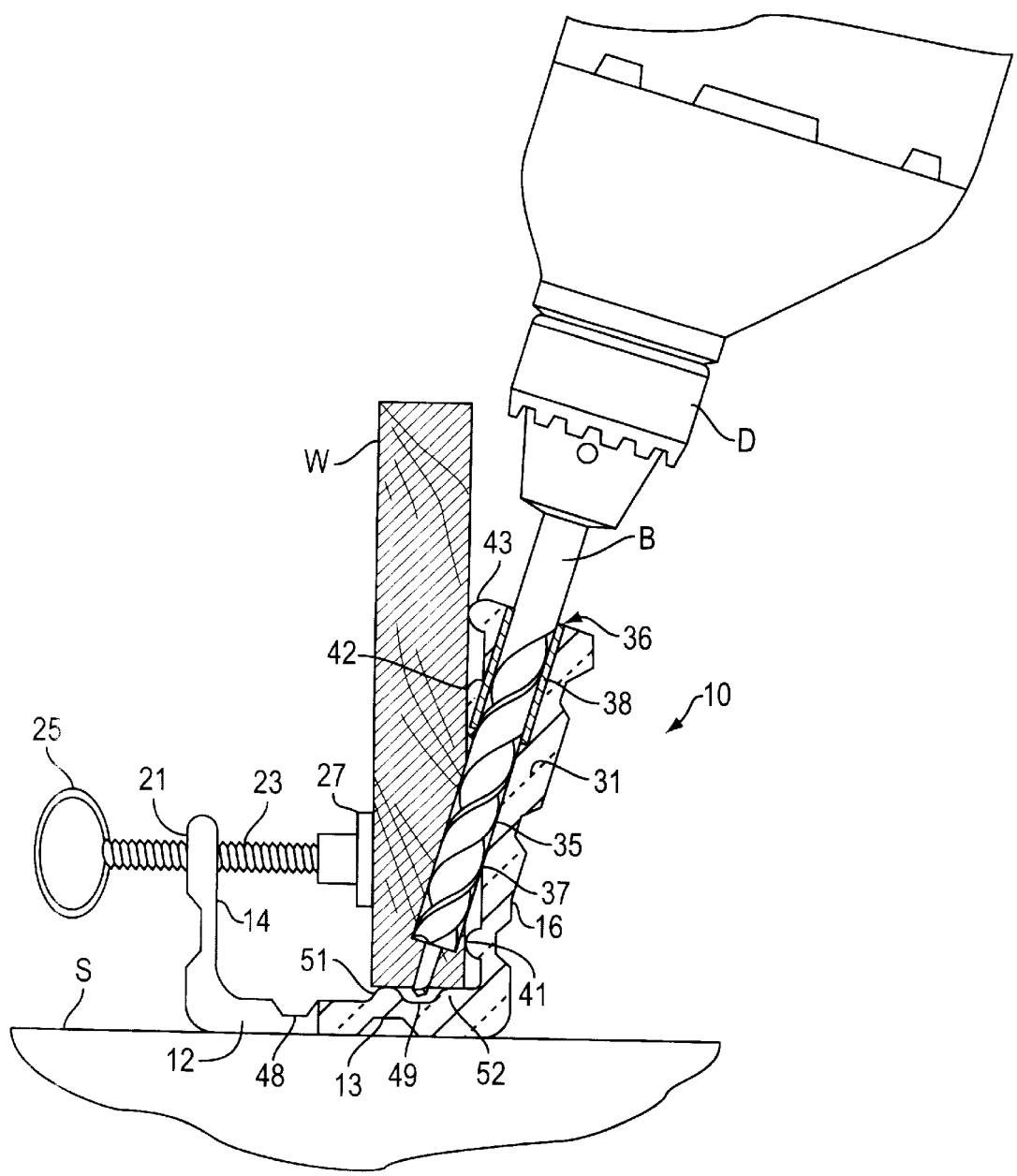
FIG. 2 is a cross sectional view in elevation.

A set of spaced ribs 41 and 42 to engage and support the workpiece is formed on the interior of the intermediate part of guide leg 16. There can be more than two of the ribs. The interior ribs 41–42 are shown extending horizontally of the leg 16 if considered to be vertical, that is, the ribs are transverse to the length of leg 16. Rib 41 is preferably positioned close to the 90° junction of the guide leg and base leg. Rib 42 is positioned near the top end of leg 16. If desired there can be a rib 43 at the extreme top end of leg 16. The outer surfaces of the ribs 41–43 are in the same plane to define positioning points in the same plane against which a first surface of a workpiece W is to rest, as shown in FIG. 2. This plane is transverse to a plane of the inner face of the base leg 12 on which a second surface of the workpiece is to rest. The exit 37 of the channel is in the space between the ribs 41–42. If desired, the ribs 41–42 can extend in the same direction as the leg 16, i.e. be vertical. Here also the channel exit 37 would be between the ribs.

The base leg interior has a recess 49 located at a point where the drill bit would exit from the workpiece. That is, the recess 49 has an approximate center at an extension of a line passing through the center of the guide channel 35. The recess can be located between two ribs 51 and 52 that extend across the base leg width as shown in FIG. 1. The top surfaces of the ribs 51–52 define the plane on which the second surface of the workpiece rests. The ribs 51–52 can extend in a direction transverse to that shown The fixture 10 is used in the following manner. The first surface of the workpiece, in which the pocket hole is to be made, is placed against the ribs 41–43 on the interior of the guide leg 16. The transverse second (end edge) surface of the workpiece rests on the interior ribs 51–52 of the base leg 12. The clamp 23 in the clamp leg 14 is adjusted by turning the screw 23 until the cap 25 engages the workpiece third surface opposite the guide leg 16. This firmly seats the workpiece in the fixture. The drill bit B is then inserted in the angled guide channel 35 and moved toward the workpiece. The drill bit is operated until the desired size hole is formed in the workpiece.

As the drill bit enters the workpiece and drills the pocket hole the wood chips are carried in the bit helical thread upwardly and drop out in the clearance space between the ribs 41–42. This prevents the drill bit and the channel 25 from clogging, which would reduce the efficiency of the drilling operation. As seen in FIG. 2 the smaller diameter end of the stepped type drill bit can enter the recess 49 in the base leg 12. This provides a measure of safety to prevent damage of the drill bit.

The fixture of the invention is of simple construction but operates efficiently to permit making a pocket hole at a precise location in a workpiece.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A fixture for drilling pocket holes in a workpiece, said fixture comprising:
    a U-shaped unitary one piece member having a base leg, a guide leg and a clamp leg with said base leg being transverse and joined to said guide leg and said clamp leg, a first surface of the workpiece in which a hole is to be drilled to engage an interior surface of said guide leg and a second workpiece surface transverse to said first workpiece surface to engage an interior surface of said base leg;
    a guide channel formed in said guide leg at an angle to said guide leg and having an entrance for a drill bit on an exterior surface of said guide leg and an exit on said guide leg interior surface which opposes the workpiece first surface; and
    an adjustable screw clamp threaded in said clamp leg and movable by rotation of the screw to engage a third surface of the workpiece that is opposite the workpiece first surface to hold the workpiece against the interior surface of said guide leg during the time a drill bit is advanced in said guide channel to said workpiece first surface.

2. A fixture as in claim 1 further comprising a set of spaced ribs on the interior of said guide leg against which the workpiece first surface rests, the exit opening of said guide channel being in a space between said set of spaced ribs.

3. A fixture as in claim 1 wherein said interior surface of said base leg has a recess located at an extension of a line of said guide channel, said recess being of a size into which the tip end of a drill bit can extend after it passes through the workpiece without the drill bit tip end engaging said base leg.

4. A fixture as in claim 2 wherein the interior of said base leg has a recess facing said exit of said guide channel into which the tip end of a drill bit can extend after it passes through the workpiece.

5. A fixture as in claim 3 wherein said recess in said base leg extends completely across the width of said base leg interior surface to permit viewing of the drill bit tip end entering into said recess from either end of said base leg.

6. A fixture as in claim 5 wherein said recess is formed between first and second spaced ribs on said base leg interior surface extending parallel to said guide leg interior surface, the workpiece second surface resting on said first and second ribs.

7. A fixture as in claim 4 wherein said recess in said base leg extends completely across the width of said base leg interior surface to permit viewing of the drill bit tip end entering into said recess from either end of said base leg.

8. A fixture as in claim 7 wherein said recess is formed between first and second spaced ribs on said base leg interior surface extending parallel to said guide leg interior surface, the workpiece second surface resting on said first and second ribs.

9. A fixture as in claim 1 further comprising a pair of through holes in said base leg for screws to pass to fasten said fixture to a surface.

10. A fixture as in claim 9 further comprising third and fourth spaced ribs on said base leg, said through holes located between said third and fourth ribs.

\* \* \* \* \*